United States Patent
Abraham et al.

(10) Patent No.: US 7,995,682 B2
(45) Date of Patent: Aug. 9, 2011

(54) METHOD AND APPARATUS FOR PERFORMING SIGNAL PROCESSING USING HISTORICAL CORRELATION DATA

(75) Inventors: Charles Abraham, Los Gatos, CA (US); Emre Tapucu, Los Gatos, CA (US)

(73) Assignee: Broadcom Corporation, Irvine, CA (US)

( * ) Notice: Subject to any disclaimer, the term of this patent is extended or adjusted under 35 U.S.C. 154(b) by 236 days.

(21) Appl. No.: 11/311,459

(22) Filed: Dec. 19, 2005

(65) Prior Publication Data
US 2006/0209935 A1 Sep. 21, 2006

Related U.S. Application Data

(63) Continuation-in-part of application No. 10/690,973, filed on Oct. 22, 2003, which is a continuation-in-part of application No. 09/963,345, filed on Sep. 26, 2001, now Pat. No. 6,819,707, which is a continuation-in-part of application No. 09/861,086, filed on May 18, 2001, now Pat. No. 6,606,346.

(51) Int. Cl.
*H03D 1/00* (2006.01)
(52) U.S. Cl. ..... 375/343; 375/316; 342/99; 342/357.78; 342/418; 701/214
(58) Field of Classification Search .................. 375/150, 375/130, 316, 343; 342/99, 357.78, 418; 701/214
See application file for complete search history.

(56) References Cited

U.S. PATENT DOCUMENTS

| | | | |
|---|---|---|---|
| 4,426,712 A | 1/1984 | Gorski-Popiel | |
| 4,445,118 A | 4/1984 | Taylor et al. | |
| 4,527,278 A | 7/1985 | Deconche et al. | |
| 4,578,678 A | 3/1986 | Hurd | |
| 4,660,164 A | 4/1987 | Leibowitz | |
| 4,785,463 A | 11/1988 | Janc et al. | |
| 4,811,362 A | 3/1989 | Yester, Jr. et al. | |
| 4,894,842 A * | 1/1990 | Broekhoven et al. | ......... 375/150 |

(Continued)

FOREIGN PATENT DOCUMENTS

DE 4114058 11/1992

(Continued)

OTHER PUBLICATIONS

Lyusin, Sergey V., et al., "Fast Acquisition by Matched Filter Technique for GPS/GLONASS Receivers", *Conference: Institute of Navigation: Satellite Division—International Technical Meeting*; 11th Proceedings of ION GPS, 1998; vol. 11, No. 1, p. 307-316; Alexandria, VA, Institute of Navig (1998), 307-316.

(Continued)

*Primary Examiner* — Chieh M Fan
*Assistant Examiner* — Leila Malek
(74) *Attorney, Agent, or Firm* — McAndrews, Held & Malloy, Ltd.

(57) ABSTRACT

A method and apparatus for estimating a satellite signal parameter in a satellite positioning system receiver is described. In an example, a plurality of correlation results between a satellite signal and a reference signal is generated and stored in a memory. At least one satellite signal parameter is estimated from the plurality of correlation results using a co-processor integrated within the satellite positioning system receiver. As the coprocessor estimates the parameter, new correlation results are added to the memory. The at least one satellite signal parameter is then provided to the processor.

32 Claims, 5 Drawing Sheets

U.S. PATENT DOCUMENTS

| | | | |
|---|---|---|---|
| 5,090,028 A | 2/1992 | Crebouw | |
| 5,117,232 A | 5/1992 | Cantwell | |
| 5,148,452 A | 9/1992 | Kennedy et al. | |
| 5,153,598 A | 10/1992 | Alves, Jr. | |
| 5,175,557 A | 12/1992 | King et al. | |
| 5,185,610 A | 2/1993 | Ward et al. | |
| 5,199,050 A | 3/1993 | Linsky | |
| 5,216,691 A | 6/1993 | Kaufmann | |
| 5,237,587 A | 8/1993 | Schoolcraft | |
| 5,293,398 A | 3/1994 | Hamao et al. | |
| 5,369,668 A | 11/1994 | Yamamoto | |
| 5,379,224 A | 1/1995 | Brown et al. | |
| 5,414,729 A | 5/1995 | Fenton | |
| 5,426,665 A | 6/1995 | Cleverly et al. | |
| 5,579,014 A | 11/1996 | Brooksby et al. | |
| 5,579,338 A | 11/1996 | Kojima | |
| 5,600,328 A | 2/1997 | Tachita et al. | |
| 5,600,670 A | 2/1997 | Turney | |
| 5,610,940 A | 3/1997 | Durrant et al. | |
| 5,629,708 A | 5/1997 | Rodal et al. | |
| 5,644,591 A | 7/1997 | Sutton | |
| 5,663,734 A | 9/1997 | Krasner | |
| 5,692,008 A * | 11/1997 | Van Nee | 375/148 |
| 5,694,416 A | 12/1997 | Johnson | |
| 5,726,659 A | 3/1998 | Kee et al. | |
| 5,727,018 A | 3/1998 | Wolf et al. | |
| 5,729,571 A | 3/1998 | Park et al. | |
| 5,768,319 A | 6/1998 | Durboraw, III | |
| 5,781,543 A | 7/1998 | Ault et al. | |
| 5,798,732 A * | 8/1998 | Eshenbach | 342/357.12 |
| 5,808,582 A | 9/1998 | Woo | |
| 5,809,064 A | 9/1998 | Fenton et al. | |
| 5,812,087 A | 9/1998 | Krasner | |
| 5,812,593 A | 9/1998 | Kaku | |
| 5,828,694 A | 10/1998 | Schipper | |
| 5,859,612 A | 1/1999 | Gilhousen | |
| 5,864,315 A | 1/1999 | Welles, II et al. | |
| 5,867,219 A | 2/1999 | Kohiyama | |
| 5,872,774 A | 2/1999 | Wheatley, III et al. | |
| 5,884,214 A | 3/1999 | Krasner | |
| 5,896,304 A | 4/1999 | Tiemann et al. | |
| 5,897,605 A | 4/1999 | Kohli et al. | |
| 5,901,171 A | 5/1999 | Kohli et al. | |
| 5,907,578 A | 5/1999 | Pon et al. | |
| 5,909,471 A | 6/1999 | Yun | |
| 5,920,278 A | 7/1999 | Tyler et al. | |
| 5,931,893 A | 8/1999 | Dent et al. | |
| 5,945,948 A | 8/1999 | Buford et al. | |
| 5,949,364 A | 9/1999 | Katzberg et al. | |
| 5,952,947 A | 9/1999 | Nussbaum et al. | |
| 5,963,264 A | 10/1999 | Jackson | |
| 5,966,402 A | 10/1999 | Yamamoto | |
| 5,999,562 A | 12/1999 | Hennedy et al. | |
| 6,002,708 A | 12/1999 | Fleming et al. | |
| 6,005,899 A | 12/1999 | Khayrallah | |
| 6,034,635 A | 3/2000 | Gilhousen | |
| 6,047,017 A | 4/2000 | Cahn et al. | |
| 6,104,340 A | 8/2000 | Krasner | |
| 6,111,868 A | 8/2000 | Lee et al. | |
| 6,118,808 A * | 9/2000 | Tiemann et al. | 375/142 |
| 6,121,923 A | 9/2000 | King | |
| 6,133,874 A | 10/2000 | Krasner | |
| 6,151,311 A | 11/2000 | Wheatley, III et al. | |
| 6,151,353 A | 11/2000 | Harrison et al. | |
| 6,157,891 A | 12/2000 | Lin | |
| 6,163,567 A | 12/2000 | Hatch | |
| 6,181,911 B1 | 1/2001 | Sih et al. | |
| 6,208,291 B1 | 3/2001 | Krasner | |
| 6,208,292 B1 | 3/2001 | Sih et al. | |
| 6,211,820 B1 | 4/2001 | Zou et al. | |
| 6,236,354 B1 | 5/2001 | Krasner | |
| 6,239,742 B1 | 5/2001 | Krasner | |
| 6,252,543 B1 | 6/2001 | Camp | |
| 6,252,629 B1 | 6/2001 | Takatori | |
| 6,252,863 B1 | 6/2001 | Raby et al. | |
| 6,256,337 B1 | 7/2001 | Hendrickson et al. | |
| 6,272,189 B1 | 8/2001 | Garin et al. | |
| 6,282,248 B1 | 8/2001 | Farrow et al. | |
| 6,289,041 B1 | 9/2001 | Krasner | |
| 6,292,132 B1 | 9/2001 | Wilson | |
| 6,298,083 B1 | 10/2001 | Westcott et al. | |
| 6,304,216 B1 | 10/2001 | Gronemeyer | |
| 6,307,840 B1 | 10/2001 | Wheatley, III et al. | |
| 6,313,786 B1 | 11/2001 | Sheynblat et al. | |
| 6,324,227 B1 | 11/2001 | Kang et al. | |
| 6,327,473 B1 | 12/2001 | Soliman et al. | |
| 6,363,108 B1 | 3/2002 | Agrawal et al. | |
| 6,370,208 B1 | 4/2002 | Kuo et al. | |
| 6,393,046 B1 | 5/2002 | Kohli et al. | |
| 6,427,122 B1 | 7/2002 | Lin | |
| 6,433,726 B1 | 8/2002 | Fan | |
| 6,441,780 B1 | 8/2002 | Rog et al. | |
| 6,542,820 B2 | 4/2003 | LeMance et al. | |
| 6,549,067 B1 * | 4/2003 | Kenington | 330/52 |
| 6,560,534 B2 | 5/2003 | Abraham et al. | |
| 6,650,692 B2 | 11/2003 | Inoue et al. | |
| 6,693,953 B2 | 2/2004 | Cox et al. | |
| 6,754,256 B1 | 6/2004 | Kubo et al. | |
| 6,775,319 B2 | 8/2004 | King et al. | |
| 6,804,290 B1 | 10/2004 | King et al. | |
| 6,829,535 B2 | 12/2004 | van Diggelen et al. | |
| 6,888,849 B2 | 5/2005 | Daniels | |
| 6,934,317 B1 | 8/2005 | Dent | |
| 7,567,636 B2 * | 7/2009 | Abraham et al. | 375/343 |
| 2001/0048388 A1 | 12/2001 | Falk et al. | |
| 2002/0033767 A1 | 3/2002 | Krasner | |
| 2002/0050944 A1 | 5/2002 | Sheynblat et al. | |
| 2002/0172306 A1 | 11/2002 | Abraham et al. | |
| 2003/0023379 A1 | 1/2003 | Diggelen et al. | |
| 2005/0276316 A1 * | 12/2005 | Rabaeijs et al. | 375/148 |
| 2009/0207951 A1 * | 8/2009 | Kim et al. | 375/343 |
| 2009/0225909 A1 * | 9/2009 | Bu | 375/343 |

FOREIGN PATENT DOCUMENTS

| | | |
|---|---|---|
| EP | 0488739 A1 | 6/1992 |
| EP | 0526040 A2 | 2/1993 |
| EP | 0635728 A1 | 1/1995 |
| EP | 0718998 A2 | 6/1996 |
| EP | 1143652 A2 | 10/2001 |
| EP | 1167993 A2 | 1/2002 |
| EP | 1388241 A | 11/2002 |
| GB | 2016760 | 9/1979 |
| WO | WO-8701540 | 3/1987 |
| WO | WO-9714057 A1 | 4/1997 |
| WO | WO-9740398 A2 | 10/1997 |
| WO | WO-9802830 A1 | 1/1998 |
| WO | WO 00/14568 | 3/2000 |
| WO | WO 00/59123 | 10/2000 |
| WO | WO-0065751 | 11/2000 |
| WO | WO-0111381 A1 | 2/2001 |
| WO | WO-0139698 A1 | 6/2001 |
| WO | WO-02096054 | 11/2002 |
| WO | WO 03/010912 | 2/2003 |

OTHER PUBLICATIONS

Wolfert, Robert, et al., "Rapid Direct P(Y)-Code Acquisition in a Hostile Environment", *Conference: Institute of Navigation: Satellite Division—International technical meeting*; 11th Proceedings of ION GPS, 1998; vol. 11; No. 1; p. 307-360 Alexandria VA, Institute of Navigation, 1 (1998), 353-360.

Sriram, Sundararajan, et al., "Low-power Correlator Architectures for Wideband CDMA Code Acquisition," Wireless Communications, Texas Instruments, Dallas, Texas, IEEE, pp. 125-129, 1999.

"The Digital Signal Processing Handbook," Section 8.5: Multirate Methods for Running Convolution, pp. 8-12-8-14, 1998.

Expert Report of Stephen Heppe Regarding Invalidity of U.S. patent Nos. 6,417,801, 6,606,346, 6,651,000, 6,704,651, 6,937,187, and 7,158,080, Feb. 25, 2008.

First Supplemental Report of Dr. Stephen Heppe Regarding Invalidity of U.S. Patent Nos. 6,417,801, 6,606,346, 6,937,187 and 7,158,080, Apr. 4, 2008.

Respondent SiRF Technology, Inc.'s First Supplemental Objections and Responses to Global Locate, Inc.'s First Set of Interrogatories (Nos. 22, 23 and 49) and Exhibits 6-7, Aug. 24, 2007.

Respondent SiRF Technology, Inc.'s Sixth Supplemental Objections and Responses to Global Locate, Inc.'s First Set of Interrogatories (Nos. 19, 21-23, and 27-28), Apr. 3, 2008.

Respondents' (Mio Technology Limited, USA; MiTAC International Corporation; Pharos Science & Applications, Inc.; E-TEN Information Systems Co. Ltd.) First Supplemental Objections and Responses in Common to Global Locate, Inc.'s First Set of Interrogatories (Nos. 22, 23 and 49) and Exhibits 6-7, Aug. 31, 2007.

Respondents' (Mio Technology Limited, USA; MiTAC International Corporation; Pharos Science & Applications, Inc.; E-TEN Information Systems Co. Ltd.) Fifth Supplemental Objections and Responses to Global Locate, Inc.'s First Set of Interrogatories (Nos. 19, 21-23 and 27-28), Apr. 3, 2008.

Melbourne, W.G., et al. "Scientific Applications of GPS on Low Earth Orbiters," Jet Propulsion Laboratory, California Institute of Technology, http://hdl.handle.net/2014/32419, 1994.

Young, L., et al. "GPS Precision Orbit Determination: Measured Receiver Performance," Jet Propulsion Laboratory, California Institute of Technology, http://hdl.handle.net/2014/35887, 1993.

Chansarkar, M., et al. "Acquisition of GPS Signals at Very Low Signal to Noise Ratio," ION NTM 2000, Anaheim, CA, pp. 731-737, Jan. 26-28, 2000.

Lemance, J., et al. "Assisted GPS—Low Infrastructure Approach," GPS World, vol. 13, No. 3, pp. 46-51, Mar. 2002.

Spilker Jr., J.J., et al. "Overview of GPS Operation and Design," Global Positioning System: Theory and Applications vol. I, Progress in Astronautics and Aeronautics, vol. 163, Ch. 2, pp. 29-55, 1996.

Aparicio., M., et al. "GPS Satellite and Payload," Global Positioning System: Theory and Applications vol. I, Progress in Astronautics and Aeronautics, vol. 163, Ch. 6, pp. 209-244, 1996.

File History—U.S. Appl. No. 10/081,164, Feb. 22, 2002.

Yiu, K., et al. "A Low-Cost GPS Receiver for Land Navigation," Global Positioning System, Hewlett-Packard Laboratories, Palo Alto, CA, pp. 44-60, May 1982.

Initial Determination, Certain GPS Devices and Products Containing Same, United States International Trade Commission Investigation No. 337-TA-602, Public Version, Nov. 25, 2008.

Rebuttal Expert Report of Michael S. Braasch, Ph.D., P.E., Regarding Validity of U.S. Patent No. 6,606,346, Redacted—Non-Confidential Version, Mar. 10, 2008.

Respondents' Notice of Prior Art, Certain GPS Devices and Products Containing Same, United States International Trade Commission Investigation No. 337-TA-602, Feb. 15, 2008.

Respondents' First Supplemental Corrected Notice of Prior Art, Certain GPS Devices and Products Containing Same, United States International Trade Commission Investigation No. 337-TA-602, Mar. 4, 2008.

Complainants' Notice of Prior Art Pursuant to Ground Rule 5, Certain GPS Devices and Products Containing Same, United States International Trade Commission Investigation No. 337-TA-602, Feb. 15, 2008.

Commission Investigation Staff's Notice of Prior Art, Certain GPS Devices and Products Containing Same, United States International Trade Commission Investigation No. 337-TA-602, Feb. 15, 2008.

Wolfert, S. et al. "Rapid Direct P(Y)-Code Acquisition in a Hostile Environment," Software Technology and Systems, Sensors Directorate, Air Force Research Lab, pp. 353-360, Sep. 15-18, 1998.

Lyusin, S., et al. "Fast Acquisition by Matched Filter Technique for GPS/GLONASS Receivers," Magellan Corp. Moscow Dev. Center, pp. 307-315, Sep. 15-18, 1998.

Namgoong, W., et al., "An All-Digital IF GPM Synchronizer for Portable Applications," in Digest of Technical Papers of the 1999 IEEE International Solid-State Circuits Conference, 1999 San Francisco, CA, pp. 340-341, 476.

Complainants' First Amended Complaint under Section 337 of the Tariff Act of 1930, as Amended, Certain GPS Devices and Products Containing Same, United States International Trade Commission Investigation No. 337-TA-602, Feb. 8, 2008.

Commission Opinion, Certain GPS Devices and Products Containing Same, United States International Trade Commission Investigation No. 337-TA-602, Jan. 27, 2009.

*SiRF* v. *Broadcom*, U.S. Court of Appeals for the Federal Circuit, 2009-1262, decided Apr. 12, 2010.

* cited by examiner

METHOD AND APPARATUS FOR PERFORMING SIGNAL PROCESSING USING HISTORICAL CORRELATION DATA

CROSS REFERENCE TO RELATED APPLICATION

This patent application is a continuation-in-part of U.S. patent application Ser. No. 10/690,973, filed Oct. 22, 2003, which is a continuation-in-part of U.S. patent application Ser. No. 09/963,345, filed Sep. 26, 2001, (now U.S. Pat. No. 6,819,707, issued Nov. 16, 2004), which is a continuation-in-part of U.S. patent application Ser. No. 09/861,086, filed May 18, 2001, (now U.S. Pat. No. 6,606,346, issued Aug. 12, 2003), each of which are incorporated by reference herein in their entireties.

BACKGROUND OF THE INVENTION

1. Field of the Invention

The present invention relates to digital signal receivers and, more particularly, the invention relates to a method and apparatus for performing signal processing using historical correlation data in, for example, a global positioning system (GPS) receiver.

2. Description of the Background Art

The process of measuring a global positioning system (GPS) signal begins with a procedure to search for the GPS signal in the presence of noise by attempting a series of correlations of the incoming signal against a known pseudo-random noise (PRN) code. The search process can be lengthy, as both the exact frequency of the signal and the time-of-arrival delay are unknown. To find the signal, receivers traditionally conduct a two dimensional search, checking each delay possibility at every possible frequency. To test for the presence of a signal at a particular frequency and delay, the receiver is tuned to the frequency, and the incoming signal is correlated with the known PRN code delayed by an amount corresponding to the time of arrival. If no signal is detected, the search continues to the next delay possibility, and after all delay possibilities are checked, continues to the next frequency possibility. Each individual correlation is performed over one or more milliseconds in order to allow sufficient signal averaging to distinguish the signal from the noise. Because many thousand frequency and delay possibilities are checked, the overall acquisition process can take tens of seconds.

Recently, new applications of GPS technology in wireless devices have emerged, for example, the use of GPS in cellular phones to provide emergency location capability. In these applications, rapid signal acquisition in just a few seconds is required. Furthermore, these applications require a GPS receiver to operate in harsh signal environments and indoors, where GPS signal levels are greatly attenuated. Detecting attenuated signals requires each correlation to be performed over a relatively long period of time. For example integration may be performed over a few seconds, as opposed to the 1-10 millisecond period used in traditional GPS receivers. The two-dimensional sequential search process employed by traditional receivers becomes impractical at such long integration times, because the overall search time increases by a factor of 100 or more.

To accelerate the search process, GPS designers add additional correlators to the receiver so that multiple time of arrival possibilities can be checked simultaneously. Typically, each correlator that is added requires a separate code mixer and signal accumulator. For a given sensitivity level, this decreases search times in proportion to the number of correlators. To achieve the sensitivity and acquisition time demanded in cellular phone applications, the design might have to incorporate thousands of correlators. This addition is typically prohibitively complex and expensive for a consumer class device.

For example, one prior technique uses a single time shared processing block to perform up to 20 simultaneous correlations on each of 12 channels. This offers an improvement in performance relative to single correlator designs since blocks of 20 delay possibilities are checked simultaneously. A full signal search over a full range of delay uncertainties requires using the block of 20 correlators approximately 100 times in succession to check 2046 delays. Thus, if an acquisition must be performed in a few seconds, the integration time is limited to tens of milliseconds. This is insufficient to achieve the sensitivity needed for indoor GPS applications.

To further improve the search process, other GPS receiver architectures include processing capable of generating a convolution between the incoming signal and the known PRN code. This is equivalent to providing a complete set of correlators spanning all time delay possibilities over a full C/A code epoch (1023 chips), and Fast Fourier Transform (FFT) based software techniques can be used to efficiently generate the necessary correlation results using software algorithms. This approach is not suitable for all applications, because a programmable digital signal processor (DSP) is needed to run the software FFT. Furthermore, this approach can have a large processing delay due to the software computations and the fact that software processing starts only after a complete snapshot of the signal is stored. In many applications, a real time processing solution is preferred, preferably one that does not involve extensive software processing None of these techniques provide for processing correlation data in real time such that entire epochs of GPS signal are correlated. Because the correlation techniques are generally executing as fast as possible, the correlation hardware and/or software is designed to generate convolutions or correlations without regard to historical correlation or convolution values. There simply is no ability to process historical correlation information.

Thus, there is a need for an improved signal processing technique that uses historical correlation data.

SUMMARY OF THE INVENTION

The invention provides a method and apparatus for computing a full convolution between an input signal (e.g., a GPS signal) and a pseudorandom noise (PRN) code reference. The method and apparatus comprises a correlator that produces a sequence of correlation results, a buffer for storing the correlation results, and a coprocessor for processing the correlation results stored in the buffer. The correlator produces correlation results as a stream at a first rate that is stored in the buffer. The coprocessor selectively processes the contents of the buffer at a second rate, where, in one embodiment, the second rate is faster than the first rate. As such, the coprocessor can repeatedly process the stored correlation results to rapidly perform a two-dimensional search (e.g., bit timing and Doppler searches) as well as other signal processing without impacting the operation of the correlator. As the coprocessor is processing the correlation results, new correlation results are added to the buffer.

BRIEF DESCRIPTION OF DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Figure 1:
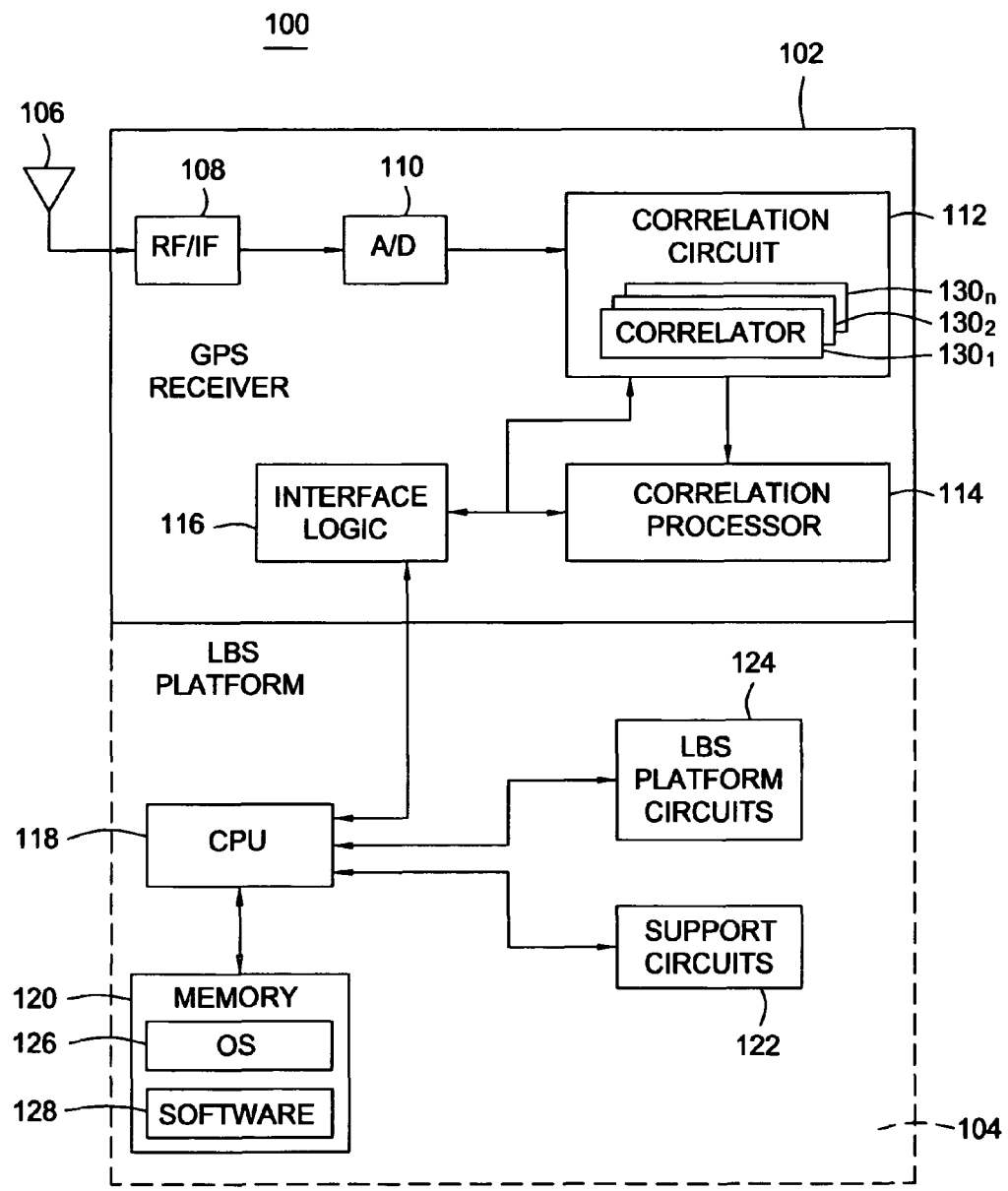
FIG. 1 depicts a block diagram of a GPS receiver comprising the present invention.

FIG. 1 depicts a block diagram of a mobile device 100 incorporating the present invention. The mobile device 100 comprises a GPS receiver 102 and a location based services (LBS) platform 104. The use of a GPS receiver within which the invention is incorporated forms one application of the invention. Other platforms that require signal correlation may find use of the present invention.

The LBS platform 104 may comprise any computing device that is capable of executing location based services (LBS) application software such as, but not limited to, cellular telephone circuitry, a personal digital assistant device, a pager, a lap top computer, a computer in an automobile, and the like. The LBS platform 104 comprises a central processing unit (CPU) 118, support circuits 122, memory 120, and LBS platform circuits 124. The CPU may comprise one or more well-known microprocessors or microcontrollers. The support circuits 122 are well-known circuits that support the operation and functionality of the CPU 118. The support circuits 122 may comprise clock circuits, input/output interface circuits, power supplies, cache, and the like. The memory 120 may comprise random access memory, read only memory, disk drives, removable memory, combinations thereof and the like. The memory generally stores an operating system 126 and software 128 such as LBS applications that, when executed by the CPU, utilize position information supplied by the GPS receiver 102 to provide various services to a user.

The LBS platform 104 may further include LBS platform circuits 124 that provide specific functions to the LBS platform. For example, the LBS platform circuits 124 may include a cellular telephone transceiver, a network interface card for coupling data to/from a computer network, a display, and/or other circuits that provide LBS platform functionality.

The GPS receiver 102 receives satellite signals, correlates the signals with a locally generated code, and uses the correlation results to determine the position of the receiver. More specifically, the receiver 102 comprises an antenna 106, a radio-frequency-to-intermediate-frequency (RF/IF) converter 108, an analog-to-digital (A/D) converter 110, a correlation circuit 112, a correlation processor 114, and interface logic 116.

Signals (such as GPS signals) are received by the antenna 106. The RF/IF converter 108 filters, amplifies, and frequency shifts the signal for digitization by the analog-to-digital converter (A/D) 110. The elements 106, 108 and 110 are substantially similar to those elements used in a conventional GPS or assisted GPS receiver.

The output of the A/D 110 is coupled to a correlation circuit 112. In one embodiment, the correlation circuit 112 comprises a multi-channel correlator (e.g., n correlation channels represented by correlators $130_1$, $130_2$, ... $130_n$, where n is an integer) that creates a series of correlation results. One such illustrative correlation circuit is described in commonly assigned U.S. Pat. Nos. 6,606,346 and 6,819,707, which are incorporated herein by reference in their entireties. The correlation circuits described in these patents represent one of many types of correlation circuits that could be used to correlate the received satellite signal (or portion thereof) with a locally generated code. Any correlation circuit that produces a series of correlation results can be used as a component of the present invention.

The correlation results (a stream that is generated at a first rate) are processed, in real-time, by the correlation processor 114. The correlation processor 114 stores and processes sets of correlation results to rapidly estimate received signal parameters that may be used to tune the correlation circuit 112 to acquire the satellite signals, e.g., the correlation processor 114 performs a two-dimensional search regarding Doppler frequency and/or bit timing. The correlation processor 114 accesses and processes the correlation results at a second rate. In one embodiment of the invention, the second rate is faster than the first rate such that the stream of correlation results from all the correlators 130 can be repeatedly processed in real-time without impacting the operation of the correlation circuit 112. In this manner, single correlation processor 114 may process multiple channels of correlation results.

The interface logic 116 couples data and control signals between the LBS platform 104 and the GPS receiver 102. The CPU 118 generates control signals that request the GPS receiver 102 to start up and acquire the satellite signals. The processed signals may be coupled to the CPU 118 for further processing or transmission to a remote location (a location server) for further processing. The use of the acquired satellite signals to determine the position of the receiver is disclosed in U.S. Pat. No. 6,453,237, which is herein incorporated by reference in its entirety.

Figure 2:
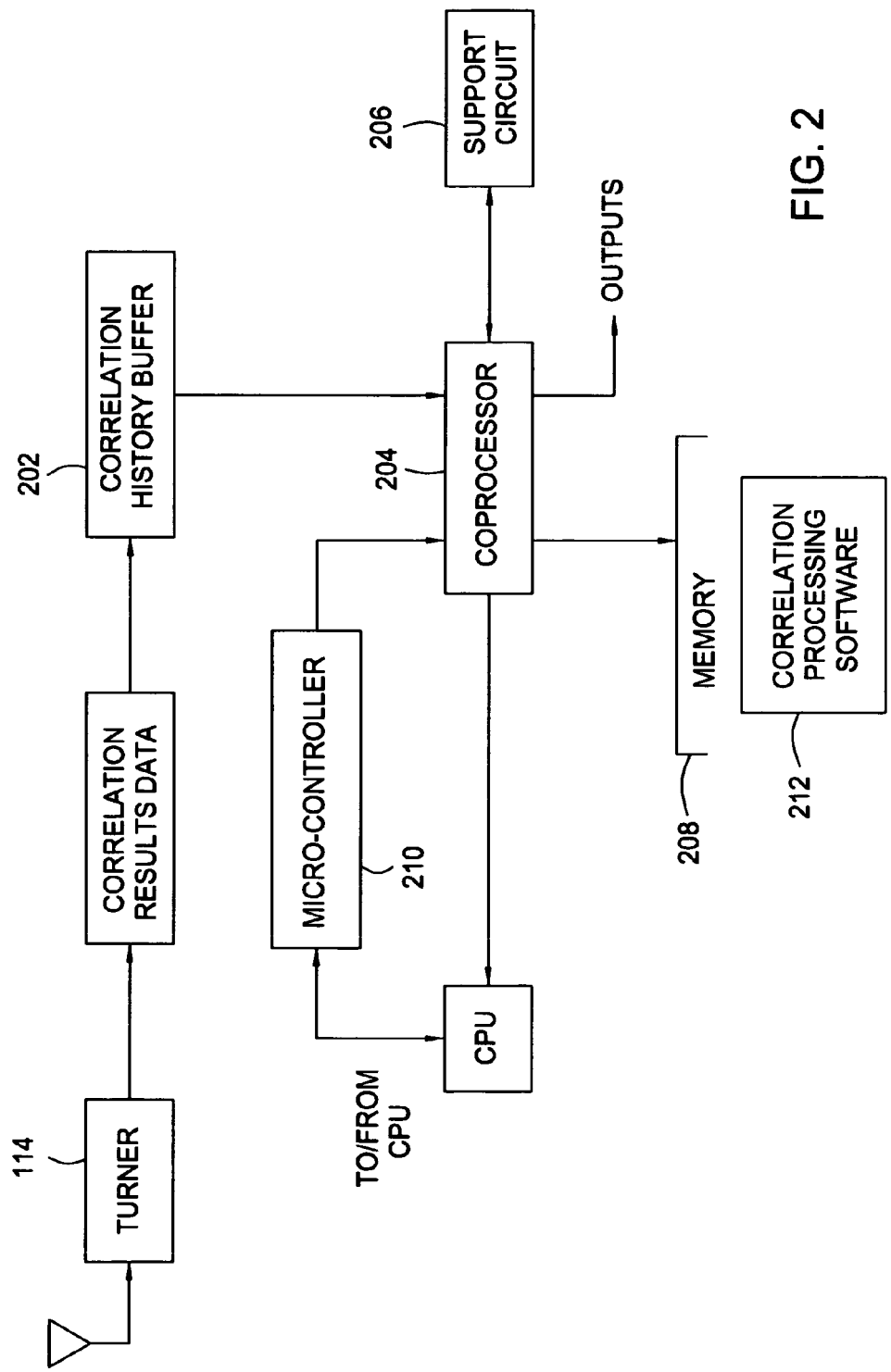
FIG. 2 depicts a block diagram of a correlation processor of the present invention.

FIG. 2 depicts a block diagram of the correlation processor 114. The correlation processor 114 comprises a correlation history buffer 202, a coprocessor 204, a microcontroller 210 and support circuits 208. The correlation results (a data stream) is coupled to the correlation history buffer 202, a memory having a length, for example, of 1000 samples per channel (e.g., one second of GPS data, where the samples are created at one millisecond intervals). The buffer may be any form of repeated use memory such as a circular buffer, a ping-pong buffer, and the like. The buffer stores a history of correlation results as the results are generated at a first rate by one or more correlators 126. The history is accessed by the coprocessor 204 and processed at least once, and, in all likelihood, many times to assist in rapidly tuning the correlation circuit. A single coprocessor 204 may process correlation results from a number of channels.

The coprocessor 204 is supported by support circuits 208 comprising, for example, cache, power supplies, dock circuits, and the like. The coprocessor 204 is also coupled to memory 208 comprising random access memory, read only memory, and/or a combination thereof. The memory comprises correlation processing software 212 (instructions) that, when executed by the coprocessor 204, enhance the acquisition of satellite signals by the receiver. In response to a request from the CPU 118 for specific information from the coprocessor, the microcontroller 210 provides program selection and sequencing signals to the coprocessor 204. Specifically, the microcontroller 210 selects the instruction set that is to be executed by the coprocessor 204 to fulfill the request from the CPU 118. The microcontroller 210 provides sequencing signals to the coprocessor 204 to step the coprocessor through the instruction set. The coprocessor 204 and microcontroller 210 are coupled to the CPU 118 of the LBS platform 100 via the interface logic 116. As such, the CPU 118 requests information from the GPS receiver 102 via the interface logic 116. The results of the coprocessor computation are coupled to the CPU 118 through the interface logic 116. In this manner, the CPU 118 can request information and then go on to perform other processes while the coprocessor performs the signal processing function. Thus, the CPU 118 is not burdened by computation of GPS signals.

Figure 3:
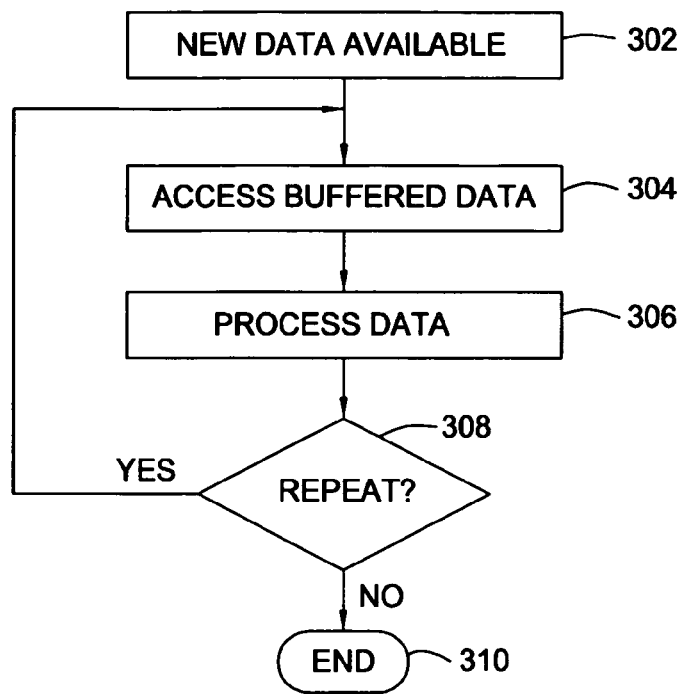
FIG. 3 depicts a flow diagram of a method of operation for the correlation processor of FIG. 2.

FIG. 3 illustrates a method 300 of operation of the coprocessor 204 using the correlation history of buffer 202 to process the received satellite signals. The method 300 represents the general functionality provided by the execution of the correlation processing software 212 that would be executed upon the microcontroller requesting a position.

Initially, correlation results are stored as they are streamed at a first rate from the correlation circuit into the buffer 202. The stream of correlation results are produced by scanning for signals across a range of delays and searching in frequency, as necessary.

The method 300 begins at step 302 when a "new data available" signal is received from the correlator. The method 300 then proceeds to step 304 where the coprocessor accesses the buffered data. At step 306, the coprocessor processes the correlation history or histories to yield an estimate of a signal parameter. Such an estimate may include the signal frequency and/or bit timing of the received signal. Since the coprocessor executes at a very high speed (a second rate), it may repeatedly process a "set" of correlation results (e.g., a 0.5 second portion of the data stored in the buffer) while additional data is accumulating in the circular buffer.

Figure 6A:
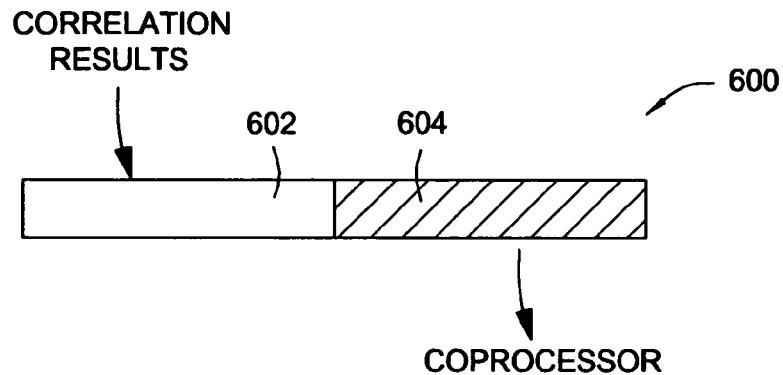
FIGS. 6A and 6B depict buffer utilization at two points in time.
Figure 6B:
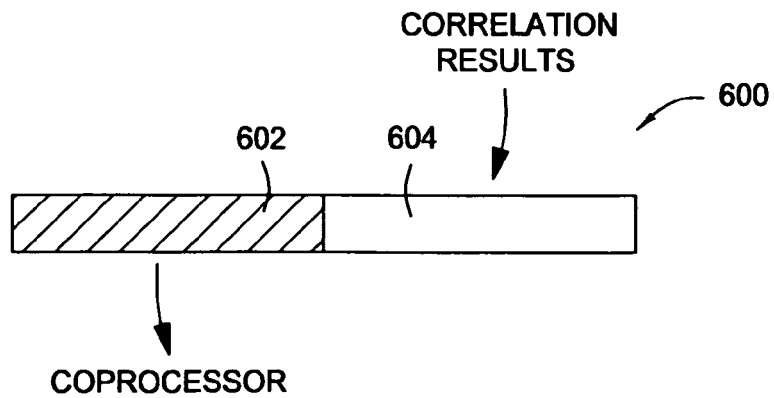
Figure 5:
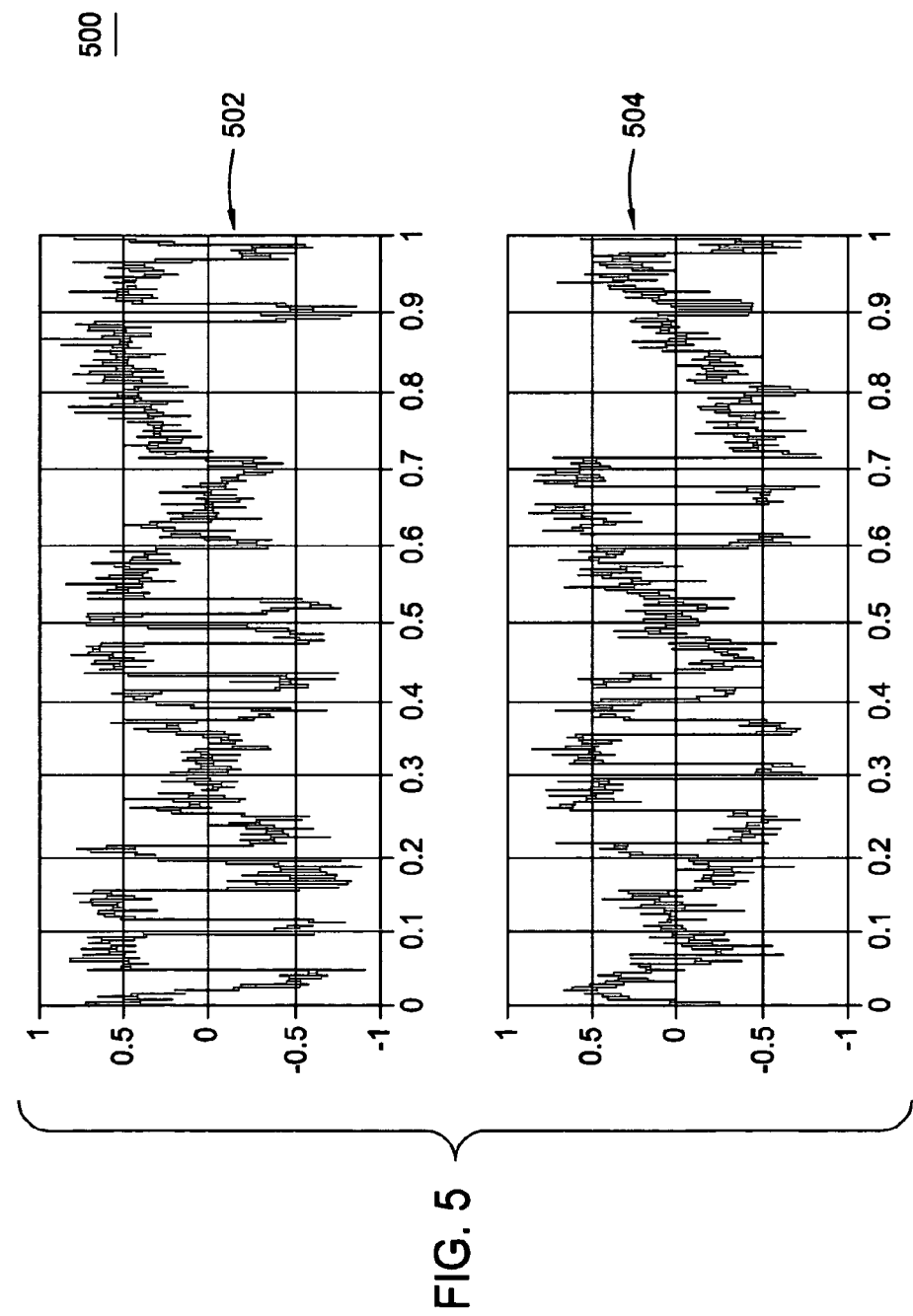
FIG. 5 depicts a graphical example of a typical correlation history.

FIG. 5 depicts a graphical example 500 of a typical correlation history. The upper and lower graphs 502 and 504 shows the I component and the Q component waveforms, respectively. Each point in the graphs represents a single coherent integration. In this example, the coherent integration interval was set to 1 epoch so each point represents nominally one millisecond of integration. FIGS. 6A and 6B depict buffer utilization during two points in time. FIG. 6A depicts one embodiment of a buffer 600 during a first period and FIG. 6B depicts the buffer 600 during a second period. During the first period, the coprocessor is operating on correlation results stored in region 604, while new results are being added to region 602 of the buffer 600. Then, when region 602 is filled, the coprocessor operates on the results in region 602, while new results are added to region 604 and old results are written over. This "ping-pong" operation continues as correlation results are generated by the correlator(s).

The receiver uses the signal parameter estimate (e.g., improved frequency and/or clock timing estimates) that are produced at step 306 to improve the correlation processing of the GPS signals. As determined by query 308, the foregoing process is repeated, as necessary, to perfect the receiver parameter estimates, e.g., a search of frequency and/or bit timing is performed in real-time. If the process is not to be repeated, the method 300 ends at step 310.

In particular, the frequency determined using the correlation history for a particular satellite can be compared to the expected range rate for that satellite to determine a difference value that can be attributed to an error in the frequency of the receiver clock, based on a stationary receiver model. Alternatively, if frequency measurements are available from three or more satellites, the errors can be used to estimate the receiver clock frequency and the receiver velocity as well. The estimated receiver oscillator frequency can be combined with the expected range rate for any satellite to determine an improved tuning frequency for detecting the satellite.

In addition, the correlation history buffer stores both I and Q data that is processed using the coprocessor to extract the navigation bits from the stored data. In this manner, the present invention provides for a faster analysis of the correlation results and does not burden the CPU 118 with correlation processing. In addition, the present invention obviates the need to provide all the correlation results to the CPU 114 for analysis. Furthermore, only a small amount of data comprising the desired satellite signal parameter(s) is sent to the CPU 118. Thus, in one embodiment, the receiver interface logic 116 comprises a serial interface to couple information to the CPU 118.

Figure 4:
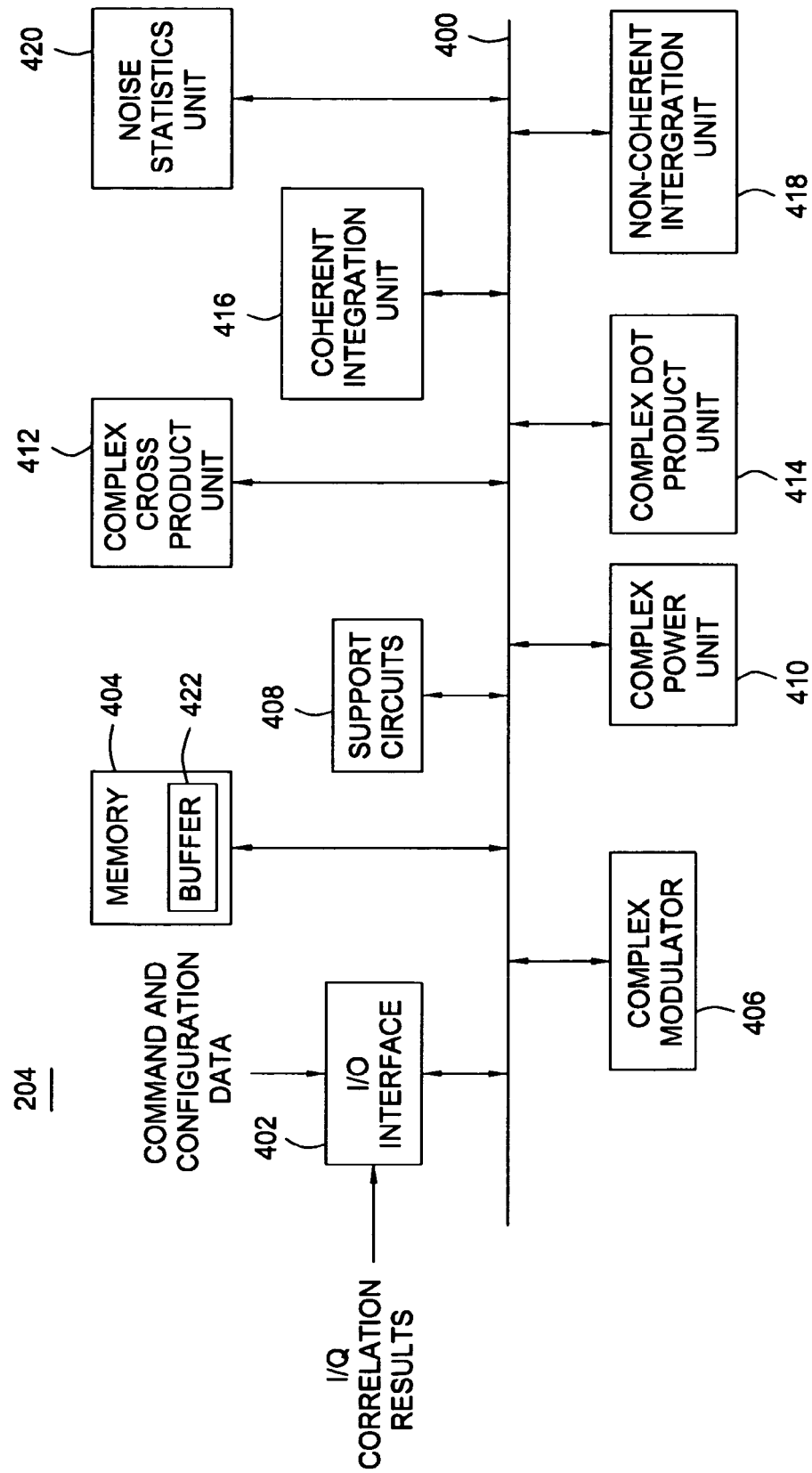
FIG. 4 depicts a functional block diagram of the coprocessor.

FIG. 4 is a block diagram depicting an exemplary embodiment of the co-processor 204. The co-processor 204 illustratively comprises a bus 400 coupled to an I/O interface 402, a memory 404, a complex modulator 406, support circuits 408, a complex power unit 410, a complex cross-product unit 412, a complex dot-product unit 414, a coherent integration unit 416, a non-coherent integration unit 418, and a noise statistics unit 420. The I/O interface 402 is configured to receive I and Q correlation results from a processing channel of the GPS receiver, as well as command and configuration data from the external processing unit. The I/Q correlation results may be stored within a buffer 422 of the memory 404. The command and configuration data is used to control the components of the co-processor 204.

The complex modulator 406 may be used to frequency tune the I/Q correlation results to compensate for Doppler. The complex power unit 410 may be used to compute the average power of a given I/Q correlation sample. The complex cross-product unit 412 may be used to compute a complex cross-product between a first I/Q correlation result and a second I/Q correlation result. The complex dot-product unit 414 may be used to compute a complex dot-product between a first I/Q correlation result and a second I/Q correlation result. The coherent integration unit 416 may be used to pre-sum a plurality of I/Q correlation results. The non-coherent integration unit 418 may be used to sum a plurality of magnitude results computed using I/Q correlation results. The noise statistics unit 420 may be used to compute various noise statistics (e.g., mean and sigma of the I/Q correlation results). The support circuits 408 comprise buffers, registers, quantizers, counters, and the like-type logic circuits for supporting operation of the co-processor 204 and the components discussed above.

Exemplary embodiments of the process 300 may be understood with reference to FIG. 4. Notably, the process 300 may be repeated as desired for various commands issued by the CPU 118 and/or the microcontroller 210. Such commands include, for example, a Doppler measurement, navigation data measurement, or a bit timing measurement. In general, the CPU 118 issues a command to request one or more satellite signal parameters, the GPS receiver 102 computes the requested satellite signal parameters using the co-processor 204, and the GPS receiver 102 returns the requested satellite signal parameters to the CPU 118.

In another example, the CPU 118 may send a Doppler measurement command to the GPS receiver 102. In one embodiment, the correlation response for one or more relative code delays between the satellite signal and the C/A reference code is stored as a correlation history. As described above, the correlation history includes I and Q samples for each coherent summing interval of the correlation circuit 112. For example, the coherent summing intervals within the correlation circuit 112 may vary from 1 to 10 epochs. After the correlation history is stored for the desired period (e.g., 1 to 10 seconds), the co-processor 204 retrieves the I and Q correlation results stored in the buffer 202 that comprise the correlation history. The co-processor 204 analyzes frequency by tracking the phase changes from sample to sample. In particular, the frequency may be found by averaging the complex cross product computed by the complex cross-product unit 412. Notably, the averaging process may comprise straight averaging, weighted averaging, integration, or other combining techniques known in the art. The complex cross-product is defined as $I(n-1)Q(n)-Q(n-1)I(n)$, where n denotes a sample number, I denotes the in-phase value of the sample, Q denotes the quadrature value of the sample. The resulting frequency value is then returned to the CPU 118.

The frequency analysis described above may be executed several times for a given Doppler measurement command. Several iterations may be necessary, since the frequency estimate provided by the complex cross-product operation has a non-linear relationship with the true frequency. After an initial estimate is made, the frequency error may be removed from the I and Q correlation results of the correlation history using the complex modulator 406. The correlation history is then re-processed and a new frequency value is determined using the complex cross-product operation. By iterating several times, the frequency estimation process will converge. Since the coprocessor operates at a speed much faster than the correlation results are produced and stored in the circular buffer, the frequency estimation is performed in real-time.

In another example, the CPU 118 may send a navigation data measurement command to the GPS receiver 102 which causes the microcontroller 210 to execute an instruction set to perform a navigation measurement. In one embodiment, the correlation response for one or more relative code delays between the satellite signal and the C/A reference code is stored as a correlation history in buffer 202. The correlation history includes I and Q samples for each coherent summing interval of the correlation circuit 112, such as a five or ten epoch coherent summing interval. After the correlation history is stored, the co-processor 204 analyzes phase changes from sample to sample to find the 180 degree phase shifts comprising the 50 bps navigation data stream. The bit transitions are found by thresholding the complex dot product computed using the complex dot-product unit 414. The complex dot-product is defined as $I(n-1)I(n)+Q(n-1)Q(n)$, where n denotes a sample number, I denotes the in-phase value of the sample, Q denotes the quadrature value of the sample. The navigation data bits are detected by the presence or absence of a bit transition. A sign ambiguity may be initially present in the navigation data, which can be resolved by detecting a known preamble sequence in the data. The resolution of this ambiguity may be performed in the CPU 118 after the data bits are received. The navigation data bits are then returned to the CPU 118. In one embodiment of the invention, for a given navigation data measurement command, the frequency estimation process described above for the Doppler measurement command may be performed before detecting the navigation data bits. Once the Doppler frequency is estimated, the frequency error may be removed from the correlation history using the complex modulator 406 and the complex dot-product operation may be performed to detect the navigation data bits.

In yet another example, the CPU 118 may send a bit timing measurement command to the GPS receiver 102 that causes the microcontroller 210 to execute a set of instruction for performing a bit timing measurement. In one embodiment, a bit timing measurement process is executed by the co-processor 204 and the resulting bit timing value returned to the CPU 118. Notably, a first command may be sent by the CPU 118 to the GPS receiver 102 to cause a correlation history to be acquired and power to be determined at a particular bit-time/frequency hypothesis. The power may be determined using the complex power unit 410. The complex power is a result of a combination of coherent and non-coherent integration to provide long integration times, up to several seconds. Additional commands are then sent to reanalyze the correlation history at different bit-time/frequency hypotheses until the hypothesis leading to the maximum power is ascertained. In particular, the co-processor 204 searches for a maximum on a 2D-surface. This embodiment is suited to determine bit timing at low signal-to-noise ratios.

In another embodiment, a single bit timing measurement command may cause the correlation circuits 112 to produce a correlation history. The correlation history includes I and Q data stored at every epoch for approximately one second. The co-processor 204 computes the complex dot products of the I and Q samples. The results are summed for each of the 20 possible bit-timing offsets to form a bit transition histogram. The correct bit-timing may be determined by identifying the bit-timing offset at which the most bit transitions occurred. The histogram values may be returned to the CPU 118. This embodiment is suited to determine bit-timing at higher signal-to-noise ratios.

Those skilled in the art will appreciate that the co-processor 204 can execute any number of operations on a set of correlation results produced by the correlation circuits 112, a subset of such operations being described above. In addition, the operations described above (e.g., frequency, navigation data measurement, bit-timing) may be executed singly or in any combination to determine one or more satellite signal parameters. Furthermore, those skilled in the art will appreciate that complex cross-product and complex dot product operations are not the only operations that may be used to make frequency and bit transition measurements. For example, various other frequency discriminators and bit timing identifiers that have been developed for GPS tracking loops may be applied in the context of the invention. For examples, see Kaplan, D Elliott, "Understanding GPS Principals and Applications", Artech House Inc, 1996 (in particular Chapter 5, Section 5.1.2.3 Frequency Lock Loops, Table 5.4). In the invention, these algorithms are implemented as post-processing operations performed by the coprocessor on the correlation history, rather than in the original formulation as real time iterative algorithms.

Although various embodiments which incorporate the teachings of the present invention have been shown and described in detail herein, those skilled in the art can readily devise many other varied embodiments that still incorporate these teachings.

The invention claimed is:

1. A method of estimating a satellite signal parameter in a satellite positioning system receiver, comprising:
generating a plurality of correlation results between a satellite signal and a reference signal, wherein generating the plurality of correlation results further comprises correlating a reference pseudo-random sequence code with an incoming signal;
storing the plurality of correlation results in a memory;
estimating at least one satellite signal parameter from the plurality of correlation results using a co-processor integrated within the satellite positioning system receiver;

while estimating the at least one satellite signal parameter, storing new correlation results in the memory; and providing the at least one satellite signal parameter to a processor; and wherein the estimating step comprises:

computing a plurality of complex dot-products using the stored correlation results; selecting a bit-timing offset;

summing complex dot-products from the plurality of complex dot-products that correspond to the selected bit timing offset; and repeating the selecting step and the summing step for a plurality of bit-timing offsets to form a histogram.

2. The method of claim 1, further comprising: estimating at least one receiver parameter using the at least one satellite signal parameter.

3. The method of claim 1, wherein the memory is a repeated use buffer and the plurality of correlation results forms a stream that is temporarily stored in the repeated use buffer.

4. The method of claim 3, wherein the estimating step further comprises: accessing a portion of the stored stream; and repeatedly processing the portion to estimate the at least one satellite signal parameter.

5. The method of claim 4 wherein the at least one satellite signal parameter comprises bit timing and Doppler frequency.

6. The method of claim 1, wherein the estimating step further comprises: frequency correcting the correlation history using a Doppler offset.

7. The method of claim 1 wherein the generating step generates the plurality of correlation results at a first rate and the estimating step processes the plurality of correlation results to estimate the at least one satellite signal parameters at a second rate, where the second rate is faster than the first rate.

8. The method of claim 7 wherein the estimating step repeatedly processes the plurality of correlation results while the plurality of correlation results are generated in real-time.

9. The method of claim 1 wherein the generating step produces correlation results for a plurality of channels and a single co-processor performs the estimating step.

10. The method of claim 1 wherein the plurality of correlation results are generated for a plurality of channels and the co-processor is a single co-processor.

11. An apparatus for estimating a satellite signal parameter in a satellite positioning system receiver, comprising:

a correlator for generating a plurality of correlation results between a satellite signal and a reference signal, wherein generating the plurality of correlation results further comprises correlating a reference pseudo-random sequence code with an incoming signal;

a repeated use buffer for storing the plurality of correlation results;

a co-processor, integrated within the satellite positioning system receiver, for estimating at least one satellite signal parameter from the plurality of correlation results, and wherein while estimating the at least one satellite signal parameter, the repeated use buffer stores new correlation results in the memory; and means for providing the at least one satellite signal parameter to a processor; and wherein the correlator generates the plurality of correlation results at a first rate and the coprocessor processes the plurality of correlation results at a second rate, where the second rate is faster than the first rate.

12. The apparatus of claim 11, wherein the repeated use buffer comprises a circular buffer.

13. The apparatus of claim 11, wherein the co-processor comprises at least one of:

a complex modulator for frequency correcting the plurality of correlation results;

a complex power unit for computing power in response to the plurality of correlation results; a complex cross-product unit for computing complex cross-products in response to the plurality of correlation results;

a complex dot-product unit for computing complex dot-products in response to the plurality of correlation results;

a coherent integration unit for coherently integrating the plurality of correlation results;

a non-coherent integration unit for non-coherently integrating the plurality of correlation results; or a noise statistics unit for determining noise statistics in response to the plurality of correlation results.

14. The apparatus of claim 11, wherein the plurality of correlation results form a stream of correlation results corresponding to been replaced by a plurality of time delayed reference signals and the satellite signal.

15. The apparatus of claim 14 wherein the coprocessor accesses a portion of the stream to estimate the at least one satellite signal parameter.

16. The apparatus of claim 11 wherein the coprocessor repeatedly processes the plurality of correlation results while the plurality of correlation results are generated by the correlator in real-time.

17. The apparatus of claim 11 further comprising a plurality of correlators for generating correlation results for a plurality of channels, and wherein a single co-processor performs the estimating step using the correlation results from the plurality of correlators.

18. A method of estimating a satellite signal parameter in a satellite positioning system receiver, comprising:

generating a plurality of correlation results between a satellite signal and a reference signal, wherein generating the plurality of correlation results further comprises correlating a reference pseudo-random sequence code with an incoming signal;

storing the plurality of correlation results in a memory;

estimating at least one satellite signal parameter from the plurality of correlation results using a co-processor integrated within the satellite positioning system receiver;

while estimating the at least one satellite signal parameter, storing new correlation results in the memory; and providing the at least one satellite signal parameter to a processor; and wherein the generating step generates the plurality of correlation results at a first rate and the estimating step processes the plurality of correlation results to estimate the at least one satellite signal parameters at a second rate, where the second rate is faster than the first rate.

19. The method of claim 18, further comprising: estimating at least one receiver parameter using the at least one satellite signal parameter.

20. The method of claim 18, wherein the memory is a repeated use buffer and the plurality of correlation results forms a stream that is temporarily stored in the repeated use buffer.

21. The method of claim 20, wherein the estimating step further comprises: accessing a portion of the stored stream; and repeatedly processing the portion to estimate the at least one satellite signal parameter.

22. The method of claim 21 wherein the at least one satellite signal parameter comprises bit timing and Doppler frequency.

23. The method of claim 18, wherein the estimating step comprises: computing a plurality of complex dot-products using the stored correlation results; selecting a bit-timing offset; summing complex dot-products from the plurality of complex dot-products that correspond to the selected bit timing offset;

and repeating the selecting step and the summing step for a plurality of bit-timing offsets to form a histogram, wherein the estimating step further comprises: frequency correcting the correlation history using a Doppler offset.

24. The method of claim 18 wherein the estimating step repeatedly processes the plurality of correlation results while the plurality of correlation results are generated in real-time.

25. The method of claim 18 wherein the generating step produces correlation results for a plurality of channels and a single co-processor performs the estimating step.

26. The method of claim 18 wherein the plurality of correlation results are generated for a plurality of channels and the co-processor is a single co-processor.

27. An apparatus for estimating a satellite signal parameter in a satellite positioning system receiver, comprising:
a correlator for generating a plurality of correlation results between an incoming satellite signal and a reference pseudo-random sequence code signal;
a repeated use buffer for storing the plurality of correlation results;
a co-processor, integrated within the satellite positioning system receiver, for estimating at least one satellite signal parameter from the plurality of correlation results, while estimating the at least one satellite signal parameter, the repeated use buffer stores new correlation results in the memory; and
means for providing the at least one satellite signal parameter to a processor;
wherein the coprocessor repeatedly processes the plurality of correlation results while the plurality of correlation results are generated by the correlator in real-time; and
wherein the correlator generates the plurality of correlation results at a first rate and the co-processor processes the plurality of correlation results at a second rate, where the second rate is faster than the first rate.

28. The apparatus of claim 27, wherein the repeated use buffer comprises a circular buffer.

29. The apparatus of claim 27, wherein the co-processor comprises at least one of:
a complex modulator for frequency correcting the plurality of correlation results;
a complex power unit for computing power in response to the plurality of correlation results; a complex cross-product unit for computing complex cross-products in response to the plurality of correlation results;
a complex dot-product unit for computing complex dot-products in response to the plurality of correlation results;
a coherent integration unit for coherently integrating the plurality of correlation results;
a non-coherent integration unit for non-coherently integrating the plurality of correlation results; or
a noise statistics unit for determining noise statistics in response to the plurality of correlation results.

30. The apparatus of claim 27, wherein the plurality of correlation results form a stream of correlation results corresponding to been replaced by a plurality of time delayed reference signals and the satellite signal.

31. The apparatus of claim 30 wherein the coprocessor accesses a portion of the stream to estimate the at least one satellite signal parameter.

32. The apparatus of claim 27 further comprising a plurality of correlators for generating correlation results for a plurality of channels, and wherein a single co-processor performs the estimating step using the correlation results from the plurality of correlators.

* * * * *